(12) United States Patent
Klemen

(10) Patent No.: US 7,604,564 B2
(45) Date of Patent: Oct. 20, 2009

(54) SEVEN SPEED TRANSMISSION WITH SIX TORQUE-TRANSMITTING MECHANISMS AND THREE PLANETARY GEAR SETS

(75) Inventor: Donald Klemen, Carmel, IN (US)

(73) Assignee: GM Global Technology Operations, Inc., Detroit, MI (US)

( * ) Notice: Subject to any disclaimer, the term of this patent is extended or adjusted under 35 U.S.C. 154(b) by 323 days.

(21) Appl. No.: 11/758,747

(22) Filed: Jun. 6, 2007

(65) Prior Publication Data

US 2008/0305918 A1 Dec. 11, 2008

(51) Int. Cl.
*F16H 3/44* (2006.01)

(52) U.S. Cl. .................... 475/280; 475/288

(58) Field of Classification Search ......... 475/275–291, 475/325, 326
See application file for complete search history.

(56) References Cited

U.S. PATENT DOCUMENTS

| | | | | |
|---|---|---|---|---|
| 3,411,382 A | * | 11/1968 | Mori | 475/33 |
| 4,976,670 A | | 12/1990 | Klemen | 475/278 |
| 7,014,589 B2 | * | 3/2006 | Stevenson | 475/284 |
| 7,204,780 B2 | * | 4/2007 | Klemen | 475/279 |
| 7,429,229 B2 | * | 9/2008 | Raghavan | 475/275 |
| 2005/0107198 A1 | | 5/2005 | Sowul et al. | |
| 2006/0094560 A1 | * | 5/2006 | Haka | 475/280 |
| 2008/0293537 A1 | * | 11/2008 | Phillips | 475/283 |

FOREIGN PATENT DOCUMENTS

DE 4106746 A1 * 9/1992 ................. 475/275

* cited by examiner

*Primary Examiner*—Charles A Marmor
*Assistant Examiner*—Justin Holmes

(57) ABSTRACT

A multi-speed transmission is provided that includes three planetary gear sets and seven torque-transmitting mechanisms with various fixed interconnections to provide seven forward speed ratios and one reverse speed ratio. The first planetary gear set is a dual sun planetary and the torque-transmitting mechanism engagement schedule is designed so that, in the reverse speed ratio, a predetermined speed ratio is achieved at the second sun gear member in the dual sun planetary and the input member, and, in the first forward speed ratio, the same magnitude predetermined speed ratio is achieved between the second sun gear member and the input member, but with the second sun gear member rotating in an opposite direction as in the reverse speed ratio.

20 Claims, 1 Drawing Sheet

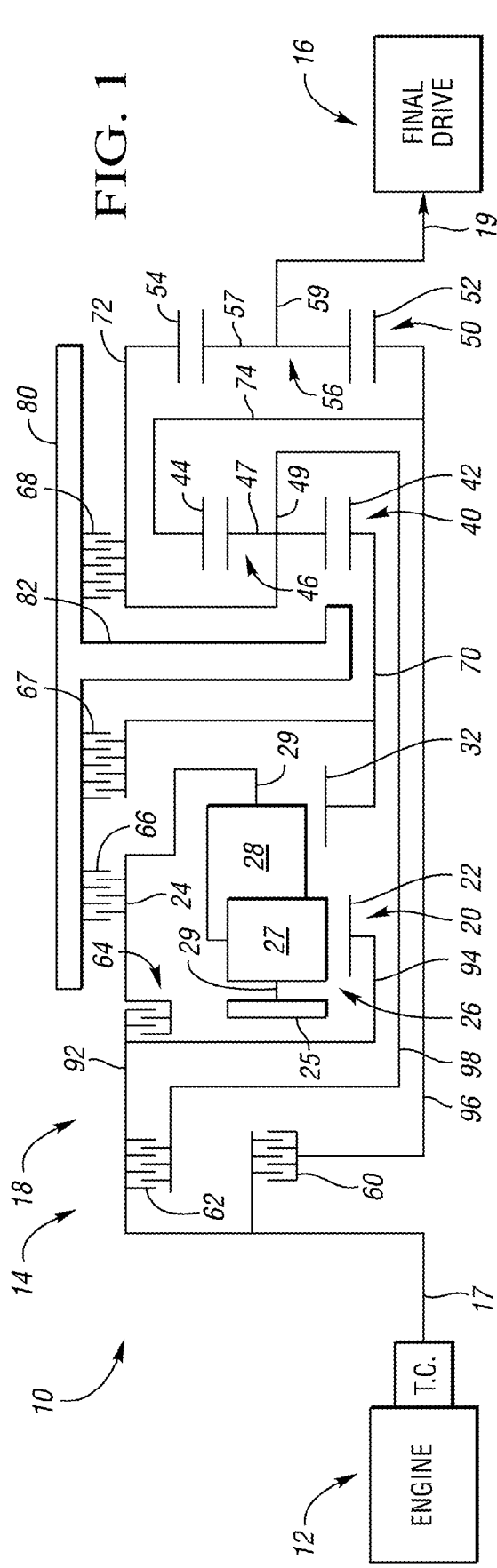

SEVEN SPEED TRANSMISSION WITH SIX TORQUE-TRANSMITTING MECHANISMS AND THREE PLANETARY GEAR SETS

TECHNICAL FIELD

The present invention relates to power transmissions having three planetary gear sets that are controlled by six torque-transmitting devices to provide seven forward speed ratios and at least one reverse speed ratio.

BACKGROUND OF THE INVENTION

Passenger vehicles include a powertrain that is comprised of an engine, a multi-speed transmission, and a differential or final drive. The multi-speed transmission increases the overall operating range of the vehicle by permitting the engine to operate through its torque range a number of times. The number of forward speed ratios that are available in the transmission determines the number of times the engine torque range is repeated. Early automatic transmissions had two speed ranges. This severely limited the overall speed range of the vehicle and therefore required a relatively large engine that could produce a wide speed and torque range. This resulted in the engine operating at a specific fuel consumption point during cruising, other than the most efficient point. Therefore, manually-shifted (countershaft transmissions) were the most popular.

With the advent of three- and four-speed automatic transmissions, the automatic shifting (planetary gear) transmission increased in popularity with the motoring public. These transmissions improved the operating performance and fuel economy of the vehicle. The increased number of speed ratios reduces the step size between ratios and therefore improves the shift quality of the transmission by making the ratio interchanges substantially imperceptible to the operator under normal vehicle acceleration.

It has been suggested that the number of forward speed ratios be increased to six or more. Six-speed transmissions are disclosed in U.S. Pat. No. 4,070,927 issued to Polak on Jan. 31, 1978; and U.S. Pat. No. 6,422,969 issued to Raghavan and Usoro on Jul. 23, 2002.

Six-speed transmissions offer several advantages over four- and five-speed transmissions, including improved vehicle acceleration and improved fuel economy. While many trucks employ power transmissions having six or more forward speed ratios, passenger cars are still manufactured with three- and four-speed automatic transmissions and relatively few five or six-speed devices due to the size and complexity of these transmissions.

Seven speed transmissions are disclosed in U.S. Pat. No. 6,623,397 issued to Raghavan, Bucknor and Usoro. Seven speed transmissions provide further improvements in acceleration and fuel economy over six speed transmissions. However, like the six speed transmissions discussed above, the development of seven speed transmissions has been precluded because of complexity, size and cost.

Typically, vehicles classified as dual usage on and off road operation, incorporate a transfer case with two speeds (typically one reduction speed ratio and one direct speed ratio) and a drop gear set used to transfer drive power to the front axles. The engagement of the transfer case employs a mechanical engagement device which has limited controllability in comparison to an electronically controlled transmission with torque-transmitting mechanisms engaged and disengaged via signals provided from an electronic control unit.

SUMMARY OF THE INVENTION

A multi-speed transmission is provided that achieves up to seven forward speeds with only six torque-transmitting mechanisms. The transmission has a deep ratio coverage which is sufficient to eliminate the typical two speed transfer case necessary in light truck applications. Reduced internal component speeds are possible with the present invention, which prolongs component life. By providing a ratio coverage of approximately 9:1 (or even 10:1 depending on gear tooth ratio selections), a transfer case with its typical high efficiency losses is not necessary. The ratio coverage added by a transfer case is achieved instead with greater precision by the transmission. The electronically controlled transmission may incorporate information on vehicle antilock brakes, steering, tire side and rolling radius variations with vehicle weight to more precisely control the transmission to ensure that the most efficient speed ratio is utilized given the above information.

Specifically, a multi-speed transmission includes an input member and an output member. A first planetary gear set is included which has a first a first sun gear member and a second sun gear member. A first and a second set of pinion gear members are rotatably supported on a carrier member. The first set of pinion gear members continuously intermeshes with the first sun gear member and the second set of pinion gear members. The second set of pinion gear members also continuously intermeshes with the second sun gear member. This type of planetary gear set is commonly referred to as a dual sun planetary. The second sun gear member is continuously interconnected with the first member of a second planetary gear set. The second planetary gear set as well as a third planetary gear set each have first, second and third members and have at least one continuous interconnection therebetween. The output member is continuously interconnected with a first member of the third planetary gear set. The input member is continuously interconnected with the first sun gear member. A first and a second torque-transmitting mechanism are utilized. The first torque-transmitting mechanism selectively engages to connect the input member with the carrier member. The second torque-transmitting mechanism selectively engages to connect the carrier member with a stationary member, such as the transmission housing. The first torque-transmitting mechanism is engaged to establish a first predetermined speed ratio between the second sun gear member and the input member in a first direction of rotation. The second torque-transmitting mechanism is engaged to establish substantially the same first predetermined speed ratio between the second sun gear member and the input member but in a second direction of rotation opposite the first direction of rotation. Preferably, the first torque-transmitting mechanism is engaged to establish a positive first predetermined speed ratio between the second sun gear member and the input member in a reverse speed ratio of the transmission. Also preferably, the second torque-transmitting mechanism is engaged to establish the first predetermined speed ratio between the sun gear member and the input member in a negative direction of rotation during a first forward speed ratio of the transmission.

A third torque-transmitting mechanism is preferably provided that is selectively engageable to connect a first interconnecting member to the stationary member. The third torque-transmitting mechanism is engaged both in the reverse speed ratio and the first forward speed ratio. Thus, the reverse power path through the first planetary gear set is also used in the first forward speed ratio.

In the preferred embodiment, a second and a third interconnecting member are also provided. The second interconnecting member continuously interconnects the third member of the second planetary gear set with the third member of the third planetary gear set. The third interconnecting member continuously interconnects the second sun gear member with the first member of the second planetary gear set.

In addition to the first, second and third torque-transmitting mechanisms, fourth, fifth and sixth torque-transmitting mechanism are also provided in order to achieve seven forward speed ratios. The fourth torque-transmitting mechanism is selectively engageable to connect the input member with the third member of the second planetary gear set. The fifth torque-transmitting mechanism is selectively engageable to connect the input member with the second member of the second planetary gear set. The sixth torque-transmitting mechanism is selectively engageable to connect the second sun gear member (and therefore the first member of the second planetary gear set) with the stationary member.

The configuration of the transmission results in a forward and a reverse path through the first planetary gear set with the same forward and reverse ratio. A compounded ratio through the second and third planetary gear sets achieves a very deep transmission ratio equally in forward and reverse. Additionally, as will be further discussed and made apparent below, high torque loading is isolated to the second interconnecting member which connects the third member of the third planetary gear set with the third member of the second planetary gear set, and is not transferred through other shafting which effects transmission sizing. The third member of the third planetary gear set is preferably a sun gear member and a third member of the second planetary gear set is preferably a ring gear member. Notably, the second member of the second planetary gear set (i.e., the carrier member) is grounded during the reverse and first forward speed ratios. By isolating the high torque loading on shafting to the second interconnecting member, only the output shaft design is influenced by the deep ratio achieved in this transmission. This reduces the diameter of the transmission package substantially over other designs with high torque output.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 1 is a schematic representation of a power train including one embodiment of a planetary transmission of the present invention;

FIG. 2A is a truth table depicting some of the operating characteristics of the powertrain shown in FIG. 1; and FIG. 2B is chart depicting other operating characteristics of the powertrain shown in FIG. 1.

DESCRIPTION OF THE PREFERRED EMBODIMENTS

Referring to the drawings, there is shown in FIG. 1 a powertrain 10 having a conventional engine and torque converter 12, a planetary transmission 14 and a conventional final drive mechanism 16.

The planetary transmission 14 includes an input shaft 17 continuously connected with the engine and torque converter 12, a planetary gear arrangement 18, and an output shaft 19 continuously connected with the final drive mechanism 16. The planetary gear arrangement 18 includes three planetary gear sets 20, 40 and 50.

The planetary gear set 20 includes a first sun gear member 22 and a second sun gear member 32. A planet carrier assembly member 26 includes a first set of pinion gear members 27 and a second set of pinion gear member 28 that are rotatably mounted on a carrier member 29. The carrier member 29 is supported by carrier wall 25. The first set of pinion gear members 27 intermesh with sun gear member 22 and with the second set of pinion gear members 28. The second set of pinion gear member 28 intermesh with the second sun gear member 32 as well. This type of planetary gear set 20 is commonly referred to as a dual sun planetary. A wall 82 extends between the first and second planetary gear sets 20, 40 and may be utilized to provide lubrication or support to each.

The planetary gear set 40 includes a sun gear member 42, a ring gear member 44 and a planet carrier assembly member 46. The planet carrier assembly member 46 includes a plurality of pinion gear members 47 rotatably mounted on a carrier member 49 and disposed in meshing relationship with both the sun gear member 42 and the ring gear member 44.

The planetary gear set 50 includes a sun gear member 52, a ring gear member 54 and a planet carrier assembly member 56. The planet carrier assembly member 56 includes a plurality of pinion gear members 57 rotatably mounted on a carrier member 59 and disposed in meshing relationship with both the sun gear member 52 and the ring gear member 54. As referred to in the claims, the planetary gear set 40 is the second planetary gear set and the planetary gear set 50 is the third planetary gear set.

The input shaft 17 is continuously connected with the sun gear member 22 via a drum 92 to which a first intermediate shaft 94 is continuously interconnected. The output member or shaft 19 is continuously connected with the carrier member 59. The second sun gear member 32 is continuously connected with the sun gear member 42 through the interconnecting member 70. The interconnecting member 70 may be one component or separate components. The carrier member 49 is continuously connected with the ring gear member 54 through the interconnecting member 72. The ring gear member 44 is continuously connected with the sun gear member 52 through the interconnecting member 74.

The input shaft 17 is selectively connectable to the ring gear member 44 (and also to the sun gear member 52 via the interconnecting member 74) via a clutch 60. The clutch 60 is referred to in the claims as a fourth torque-transmitting mechanism. An innermost shaft 96 extends between the clutch 60 and the sun gear member 52 to transfer torque from the input member 17 when the clutch 60 is engaged. A clutch 62 (which is referred to in the claims as a fifth torque-transmitting mechanism) is selectively engageable to connect the input shaft 17 to the carrier member 49 via a second intermediate shaft 98. A clutch 64 (which is referred to in the claims as a first torque-transmitting mechanism) is selectively engageable to connect the input shaft 17 with the carrier member 29. A brake 66 (which is referred to in the claims as a second torque-transmitting mechanism) is selectively engageable to connect the carrier member 29 to a stationary member 80 such as the transmission housing. A brake 67 (which is referred to in the claims as a sixth torque-transmitting mechanism) is selectively engageable to ground the sun gear member 32 (and the sun gear member 42 via the interconnecting member 70) to the transmission housing 80. Finally, a brake 68 (which is referred to in the claims as a third torque-transmitting mechanism) is selectively engageable to ground the carrier member 49 (and also the ring gear member 54 via the interconnecting member 72) to the transmission housing 80.

As shown in FIG. 2A, the torque-transmitting mechanisms are selectively engageable in combinations of two to provide seven forward speed ratios and a reverse speed ratio. The torque-transmitting mechanisms 60, 62, 64, 66, 67 and 68 are preferably of the multiple disk-type, fluid actuated fluid-drive establishing device which are commonly used in planetary gear transmissions.

The reverse speed ratio is established with the engagement of the clutch 64 and the brake 68. The clutch 64 connects the input member 17 with the carrier member 29, and the brake 68 connects the carrier member 49 and the ring gear member 54 with the transmission housing 80. Because both the first sun gear member 22 and the carrier member 29 are forced to rotate at the same speed and direction as the input member 17, all of the members of the first planetary gear set including the first and second sets of pinion gear members 27, 28 and the second sun gear member 32 rotate at the same speed and in the same direction as the input member. The sun gear member 42 also rotates in the same direction as the input member. The carrier member 49 and the ring gear member 54 do not rotate. The ring gear member 44 rotates at a speed determined from the speed of the sun gear member 42 and the ring gear/sun gear tooth ratio of the planetary gear set 40, but, opposite in rotational direction to the input member 17 and sun gear member 42. The sun gear member 52 rotates at the same speed as the ring gear member 44. The carrier member 59 rotates at the same speed as the output shaft 19. The carrier member 59, and therefore the output shaft 19, rotates at a speed determined from the speed of the sun gear member 52 and the ring gear/sun gear tooth ratio of the planetary gear set 50. Assuming the following tooth numbers, the speed ratio of the second sun gear member 32 to the input shaft 17 is 1.0: the first sun gear member has 49 teeth, the pinion gear members of the first set each have 31 teeth, the pinion gear members of the second set each have 31 teeth and the second sun gear member has 45 teeth. The following tooth number counts may also be utilized: the sun gear member 42 has 31 teeth, the pinion gear members 47 each have 18 teeth, the ring gear member 44 has 67 teeth, the ring gear member 54 has 67 teeth, the pinion gear members 57 each have 20 teeth and the sun gear member 52 has 27 teeth. This results in a ring gear/sun gear tooth ratio of the planetary gear set 40 of 2.16 and a ring gear/sun gear tooth ratio of 2.48 for the planetary gear set 50. The numerical value of the reverse speed ratio is determined utilizing the ring gear/sun gear tooth ratio of the planetary gear sets 40 and 50.

The first forward speed ratio is established with the engagement of the clutch 66 and the brake 68. The clutch 66 grounds the carrier member 29 to the transmission housing 80 and the brake 68 grounds the carrier member 49 and the ring gear member 54 to the transmission housing 80. The sun gear member 22 rotates at the same speed and in the same direction as the input shaft 17. The first set of pinion gear members 27 rotate in an opposite direction. The second set of pinion gear members 28 mesh with the first set of pinion gear members 27 and are driven in an opposite direction which is the same direction as the input member 17. The second set of pinion gear members 28 drive the second sun gear member 32 in an opposite direction from the input member 17. With the sample tooth gear counts discussed above, the speed of the second sun gear member 32 to the speed of the input member 17 is −1.09, although, with different tooth gear counts it can be set at −1.0 to produce equal forward and reverse ratios. The sun gear member 42 also rotates in an opposite direction from the input shaft 17 but at the same speed as the sun gear member 32. The carrier member 49 and the ring gear member 54 do not rotate. The ring gear member 44 rotates at the same speed as the sun gear member 52. The ring gear member 44 rotates at a speed determined from the speed of the sun gear member and the ring gear/sun gear tooth ratio of the planetary gear set 40. The carrier member 59 rotates at the same speed as the output shaft 19. The carrier member 59 rotates at a speed determined from the speed of the sun gear member 52 and the ring gear/sun gear tooth ratio of the planetary gear set 50. The numerical value of the first forward speed ratio is determined utilizing the ring gear/sun gear tooth ratios of the planetary gear sets 20, 40 and 50.

The second forward speed ratio is established with the engagement of the clutch 60 and the brake 68. The clutch 60 connects the ring gear member 44 (and the sun gear member 52 via the interconnecting member 74) to the input shaft 17. The brake 68 connects the carrier member 49 (and the ring gear member 54 via the interconnecting member 72) to the stationary housing 80. The sun gear member 22 rotates in the same direction as the input shaft 17 and drives the pinion gear members 27 in an opposite direction. The pinion gear member 27 in turn drives the pinion gear members 28 in the same direction as the input shaft 17. The sun gear member 32 is driven in the opposite direction as the input member 17 by the ring gear members 44; therefore the sun gear member 32 also rotates in an opposite direction as the input member 17. The ring gear member 44 and the sun gear member 52 rotate at the same speed as the input shaft 17. The carrier member 59 rotates at the same speed as the output shaft 19. The carrier member 59, and therefore the output shaft 19, rotates at a speed determined from the speed of the ring gear member 54, the speed of the sun gear member 52 and the ring gear/sun gear tooth ratio of the planetary gear set 50. The numerical value of the second forward speed ratio is determined by the ring gear/sun gear tooth ratio of the planetary gear set 50.

The third forward speed ratio is established with the engagement of the clutch 60 and the brake 66. The clutch 60 connects the input member 17 to the ring gear member 44 and the sun gear member 52, and the brake 66 connects the carrier member 29 to the stationary housing 80. The first sun gear member 22 rotates at the same speed as the input member 17 and in the same direction. The sun gear member 22 drives the first set of pinion gears 27 in an opposite direction which in turn drive the second set of pinion gears 28 in the same direction as the input shaft 17. The second sun gear member 32 is driven in an opposite direction as the input shaft 17 and, therefore, the sun gear member 42 also rotates in an opposite direction as the input shaft 17 and at the same speed as the sun gear member 32. The ring gear member 44 and the sun gear member 52 rotates at the same speed as the input shaft 17. The carrier member 49 rotates at the same speed as the ring gear member 54, and at a speed determined from the tooth count of the planetary gear set 40 and the speeds of the sun gear member 42 and ring gear member 44. The carrier member 59 rotates at the same speed as the output shaft 19. The carrier member 59, and therefore the output shaft 19, rotates at a speed determined from the speed of the ring gear member 54, the speed of the sun gear member 52 and the ring gear/sun gear tooth ratio of the planetary gear set 50. The numerical value of the third forward speed ratio is determined utilizing the tooth counts of the planetary gear set 20 as well as the ring gear/sun gear tooth ratio of the planetary gear sets 40 and 50.

The fourth forward speed ratio is established with the engagement of the clutch 60 and the brake 67. The clutch 60 connects the ring gear member 44 (and therefore the sun gear member 52 via the interconnecting member 74) to the input shaft 17. The brake 67 connects the sun gear members 32 and 42 to the transmission housing 80. The sun gear members 32 and 42 do not rotate. The ring gear member 44 (and the sun gear member 52 via the interconnecting member 74) rotates at the same speed as the input shaft 17. The carrier member 49 rotates at the same speed as the ring gear member 54. The carrier member 59 rotates at the same speed as the output shaft 19. The carrier member 59, and therefore the output shaft 19, rotates at a speed determined from the speed of the ring gear member 54, the speed of the sun gear member 52 and the ring gear/sun gear tooth ratio of the planetary gear set 50. The numerical value of the fourth forward speed ratio is determined utilizing the ring gear/sun gear tooth ratio of the planetary gear set 50.

The fifth forward speed ratio is established with the engagement of the clutches 60 and 62. The clutch 60 connects the ring gear member 44 and the sun gear member 52 with the input member 17, and the clutch 62 connects the carrier member 49 and the ring gear member 54 with the input member 17. Because the carrier member 49 and the ring gear member 44 rotate at the speed of the input member 17, the entire planetary gear set 40 rotates at the speed of the input member 17. Likewise, because the sun gear member 52 and the ring gear member 54 rotate at the speed of the input member 17, the entire planetary gear set 50 rotates at the speed of the input member 17. Accordingly, the output member 19 rotates at the speed of the input member 17, such that the numerical value of the fifth forward speed ratio is one.

The sixth forward speed ratio is established with the engagement of the clutch 62 and the brake 67. The clutch 62 connects the carrier member 49 and the ring gear member 54 with the input shaft 17, and the brake 67 connects the sun gear members 32 and 42 with the transmission housing 80. The sun gear members 32 and 42 do not rotate. The carrier member 49 and the ring gear member 54 rotate at the same speed as the input shaft 17. The ring gear member 44 then rotates at a speed determined by the ring gear/sun gear tooth ratio of planetary gear set 40. The ring gear member 44 rotates at the same speed as the sun gear member 52. The carrier member 59 rotates at the same speed as the output shaft 19. The carrier member 59, and therefore the output shaft 19, rotates at a speed determined from the speed of the ring gear member 54, the speed of the sun gear member 52 and the ring gear/sun gear tooth ratio of the planetary gear set 50. The numerical value of the sixth forward speed ratio is determined utilizing the ring gear/sun gear tooth ratio of the planetary gear sets 40 and 50.

The seventh forward speed ratio is established with the engagement of the clutch 62 and the brake 66. The clutch 62 connects the carrier member 49 and the ring gear member 54 with the input shaft 17, and the brake 66 connects the carrier member 29 with the transmission housing 80. As described above with respect to the first numerical speed ratio, the sun gear member 32 rotates in an opposite direction as the input shaft 17. The carrier member 49 and the ring gear member 54 rotate at the same speed as the input shaft 17. The ring gear member 44 rotates at the same speed as the sun gear member 52, at a speed determined from the ring gear/sun gear tooth ratio of the planetary gear set 40, the input speed to the carrier member 49 as determine by the clutch 62 and the speed of sun gear member 32 determined by the ring gear/sun gear ratio of the planetary gear set 20. The carrier member 59 rotates at the same speed as the output shaft 19. The carrier member 59, and therefore the output shaft 19, rotates at a speed determined from the speed of the ring gear member 54, the speed of the sun gear member 52 and the ring gear/sun gear tooth ratio of the planetary gear set 50. The numerical value of the seventh forward speed ratio is determined utilizing the ring gear/sun gear tooth ratio of the planetary gear sets 20, 40 and 50.

As set forth above, the engagement schedule for the torque-transmitting mechanisms is shown in the truth table of FIG. 2A. This truth table also provides an example of speed ratios that are available utilizing the tooth counts and ring gear/sun gear tooth ratios given by way of example in the discussion above. Also, the chart of FIG. 2B describes the ratio steps that are attained utilizing the sample tooth counts and tooth ratios given. For example, the step ratio between the first and second forward speed ratios is 1.98, while the step ratio between the reverse ratio and the first forward speed ratio is −1.09. It should be noted that single and double step forward ratio interchanges are of the single transition variety.

The transmission 14 of FIG. 1 provides a unique mechanism for achieving a speed ratio between the second sun gear member 32 and the input member 17 of equal magnitude but opposite direction in the reverse transmission speed ratio (speed of output member 19 to input member 17) as in the first forward transmission speed ratio (speed of output member 19 to input member 17) via the dual sun first planetary gear set 20. As is apparent from the speed ratios shown in the truth table of FIG. 2A, the transmission 14 provides a deep ratio, progressive step solution. Transmission speed ratios for the reverse and the first forward speeds are very close in value although reversed in direction from one another. The reverse and first forward transmission speed ratios are very deep ratios at −7.52 and 6.91, respectively. This is useful for towing applications. Additionally, relatively evenly spaced ratio steps are provided throughout along with the wide ratio spread of 8.86.

While the best modes for carrying out the invention have been described in detail, those familiar with the art to which this invention relates will recognize various alternative designs and embodiments for practicing the invention within the scope of the appended claims.

The invention claimed is:
1. A multi-speed transmission comprising:
an input member;
an output member;
a first planetary gear set having:
  a first sun gear member;
  a second sun gear member;
  a first and a second set of pinion gear members rotatably supported on a carrier member, said first set of pinion gear members continuously intermeshing with said first sun gear member and said second set of pinion gear members, said second set of pinion gear members also continuously intermeshing with said second sun gear member;
a second and a third planetary gear set each having first, second and third members, and having at least one continuous interconnection therebetween, said second sun gear member being continuously interconnected with a first member of said second planetary gear set;
wherein said output member is continuously interconnected with a first member of said third planetary gear set; wherein said input member is continuously interconnected with said first sun gear member;
a first torque-transmitting mechanism selectively engageable to connect said input member with said carrier member;
a second torque-transmitting mechanism selectively engageable to connect said carrier member with a stationary member;
wherein said first torque-transmitting mechanism is engaged to establish a first predetermined speed ratio between said second sun gear member and said input member in a first direction of rotation; and wherein said second torque-transmitting mechanism is engaged to establish said first predetermined speed ratio between said second sun gear member and said input member in a second direction of rotation opposite said first direction of rotation.

2. The multi-speed transmission of claim 1, wherein said first predetermined speed ratio is substantially unity.

3. The multi-speed transmission of claim 1, wherein said at least one continuous interconnection includes a first interconnecting member that connects said second member of said second planetary gear set with said second member of said third planetary gear set, and further comprising:

a third torque-transmitting mechanism selectively engageable to connect said first interconnecting member to said stationary member;

wherein said third torque-transmitting mechanism is also engaged when said first torque-transmitting mechanism is engaged to establish said first predetermined speed ratio with said first direction of rotation at said second sun gear member and when said second torque-transmitting mechanism is engaged to establish said first predetermined speed ratio with said second direction of rotation at said second sun gear member.

4. The multi-speed transmission of claim 3, wherein engagement of said first and third torque-transmitting mechanisms establishes a reverse speed ratio between said input member and said output member; and wherein engagement of said second and third torque-transmitting mechanisms establishes a first forward speed ratio between said input member and said output member.

5. The multi-speed transmission of claim 3, further comprising:

a fourth torque-transmitting mechanism selectively engageable to connect said input member with said third member of said second planetary gear set.

6. The multi-speed transmission of claim 5, wherein said at least one interconnection includes a second interconnecting member continuously interconnecting said third member of said second planetary gear set with said third member of said third planetary gear set.

7. The multi-speed transmission of claim 3, further comprising:

a fifth torque-transmitting mechanism selectively engageable to connect said input member with said second member of said second planetary gear set.

8. The multi-speed transmission of claim 3, further comprising:

a sixth torque-transmitting mechanism selectively engageable to connect said second sun gear member with said stationary member.

9. The multi-speed transmission of claim 8, further comprising:

a third interconnecting member continuously interconnecting said second sun gear member with said first member of said second planetary gear set.

10. The multi-speed transmission of claim 3, further comprising:

a fourth torque-transmitting mechanism selectively engageable to connect said input member with said third member of said second planetary gear set;

a fifth torque-transmitting mechanism selectively engageable to connect said input member with said second member of said second planetary gear set; and a sixth torque-transmitting mechanism selectively engageable to connect said second sun gear member with said stationary member.

11. A multi-speed transmission comprising:

an input member;

an output member;

first, second and third planetary gear sets, said first planetary gear set including:

first and second sun gear members;

first and second sets of pinion gear members rotatably supported on a carrier member, said first set of pinion gear members continuously intermeshing with said first sun gear member and said second set of pinion gear members, said second set of pinion gear members also continuously intermeshing with said second sun gear member;

wherein said second and third planetary gear sets each include a first, a second and a third member;

a first interconnecting member continuously interconnecting said second member of said second planetary gear set with said second member of said third planetary gear set;

a second interconnecting member continuously interconnecting said third member of said second planetary gear set with said third member of said third planetary gear set;

a third interconnecting member continuously interconnecting said second sun gear member with said first member of said second planetary gear set;

said input member being continuously interconnected with said first sun gear member and said output member being continuously interconnected with said first member of said third planetary gear set; and six torque-transmitting mechanisms operable for selectively interconnecting selected ones of said members of said planetary gear sets with said input member, with a stationary member or with other ones of said members of said planetary gear sets to establish at least seven forward speed ratios and a reverse speed ratio between said input member and said output member.

12. The multi-speed transmission of claim 11, wherein said torque-transmitting mechanisms are engageable in pairs to establish said speed ratios between said input member and said output member.

13. The multi-speed transmission of claim 11, wherein a first of said six torque-transmitting mechanisms is selectively engageable to connect said input member with said carrier member.

14. The multi-transmissions of claim 13, wherein a second of said six torque-transmitting mechanisms is selectively engageable to connect said carrier member with said stationary member;

wherein said first torque-transmitting mechanism is engaged to establish a first predetermined speed ratio between said second sun gear member and said input member in a first direction of rotation; and wherein said second torque-transmitting mechanism is engaged to establish said first predetermined speed ratio between said second sun gear member and said input member in a second direction of rotation opposite said first direction of rotation.

15. The multi-speed transmission of claim 11, wherein a second of said six torque-transmitting mechanisms is selectively engageable to connect said carrier member with said stationary member.

16. The multi-speed transmission of claim 11, wherein a third of said six torque-transmitting mechanisms is selectively engageable to connect said second member of said second planetary gear set with said stationary member.

17. The multi-speed transmission of claim 11, wherein a fourth of said six torque-transmitting mechanisms is selectively engageable to connect said third member of said second planetary gear set with said input member.

18. The multi-speed transmission of claim 11, wherein a fifth of said six torque-transmitting mechanisms is selectively engageable to connect said second member of said second planetary gear set with said input member.

19. The multi-speed transmission of claim 11, wherein a sixth of said six torque-transmitting mechanisms is selectively engageable to connect said second sun gear member with said stationary member.

20. A multi-speed transmission comprising:
   an input member;
   an output member;
   a first planetary gear set having:
      a first sun gear member;
      a second sun gear member;
      a first and a second set of pinion gear members rotatably supported on a carrier member, said first set of pinion gear members continuously intermeshing with said first sun gear member and said second set of pinion gear members, said second set of pinion gear members also continuously intermeshing with said second sun gear member;
   a second and a third planetary gear set each having first, second and third members, and having a first interconnecting member therebetween, said second sun gear member being continuously interconnected with a first member of said second planetary gear set;
   wherein said output member is continuously interconnected with a first member of said third planetary gear set;
   wherein said input member is continuously interconnected with said first sun gear member;
   a first torque-transmitting mechanism selectively engageable to connect said input member with said carrier member;
   a second torque-transmitting mechanism selectively engageable to connect said carrier member with a stationary member;
   wherein said first torque-transmitting mechanism is engaged to establish a first predetermined speed ratio between said second sun gear member and said input member in a first direction of rotation;
   wherein said second torque-transmitting mechanism is engaged to establish said first predetermined speed ratio between said second sun gear member and said input member in a second direction of rotation opposite said first direction of rotation;
   a third torque-transmitting mechanism selectively engageable to selectively connect said first interconnecting member to said stationary member; and
   wherein engagement of said first and third torque-transmitting mechanisms establishes a reverse speed ratio between said input member and said output member.

* * * * *